US012587380B2

(12) United States Patent
Fleming et al.

(10) Patent No.: US 12,587,380 B2
(45) Date of Patent: Mar. 24, 2026

(54) TRUSTED EXECUTION ENVIRONMENT FOR DISTRIBUTED DATA SECURITY IN THE SERVICE MESH

(71) Applicant: Cisco Technology, Inc., San Jose, CA (US)

(72) Inventors: Charles Fleming, Oxford, MS (US); Ramana Rao V. R. Kompella, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 18/381,835

(22) Filed: Oct. 19, 2023

(65) Prior Publication Data
US 2025/0132918 A1    Apr. 24, 2025

(51) Int. Cl.
| | |
|---|---|
| *H04L 9/32* | (2006.01) |
| *G06F 21/64* | (2013.01) |
| *G06F 21/57* | (2013.01) |
| *G06F 21/60* | (2013.01) |

(52) U.S. Cl.
CPC ............ *H04L 9/3218* (2013.01); *G06F 21/64* (2013.01); *H04L 9/3234* (2013.01); *G06F 21/57* (2013.01); *G06F 21/602* (2013.01)

(58) Field of Classification Search
CPC ..... H04L 9/3218; H04L 9/3234; G06F 21/64; G06F 21/602; G06F 21/57
See application file for complete search history.

(56) References Cited

U.S. PATENT DOCUMENTS

| | | | |
|---|---|---|---|
| 2015/0381575 A1* | 12/2015 | Bhargav-Spantzel | ...................... H04L 63/061 713/168 |
| 2018/0109538 A1 | 4/2018 | Kumar et al. | |
| 2019/0188712 A1* | 6/2019 | Fedorov | .................. G06F 21/53 |
| 2020/0272737 A1 | 8/2020 | Ji | |
| 2021/0019420 A1* | 1/2021 | Regupathy | ............ G06F 9/4812 |
| 2022/0058268 A1* | 2/2022 | Thom | ...................... G06F 21/57 |
| 2022/0129542 A1 | 4/2022 | Sun et al. | |
| 2022/0329573 A1 | 10/2022 | Sood et al. | |
| 2023/0036165 A1* | 2/2023 | Bursell | .................... G06F 21/78 |
| 2023/0394150 A1* | 12/2023 | Schmatz | ................. G06F 21/57 |
| 2024/0220639 A1* | 7/2024 | Sahu | ...................... G06F 21/602 |
| 2024/0241960 A1* | 7/2024 | King | ...................... G06F 21/57 |

(Continued)

OTHER PUBLICATIONS

Adam et al. Partially Trusting the Service Mesh Control Plane Oct. 23, 2022 arXiv:2210.12610 (Year: 2022).*

(Continued)

*Primary Examiner* — David J Pearson
(74) *Attorney, Agent, or Firm* — Lee & Hayes, P.C.

(57) ABSTRACT

In one implementation, a method is disclosed comprising: associating, by a device in a service mesh, a security function with a portion of an online application that is executed in a distributed manner across the service mesh; executing, by the device, the security function and the portion of the online application within a trusted execution environment of the device to produce output data; generating, by the device, a cryptographic proof for the output data based on the security function; and providing, by the device, the output data and the cryptographic proof to a remote execution environment within the service mesh to establish a verifiable data lineage for the output data.

20 Claims, 5 Drawing Sheets

(56) References Cited

U.S. PATENT DOCUMENTS

2024/0291650 A1 *   8/2024   Cela ...................... G06F 21/602
2024/0427908 A1 * 12/2024   Huo ........................ G06F 21/53

OTHER PUBLICATIONS

Hashicorp Developer: "Secure Applications with Service Sidecar Proxies", online: https://developer.hashicorp.com/consul/tutorials/ kubernetes/service-mesh-application-secure-networking, accessed Nov. 17, 2023, 13 Pages.

* cited by examiner

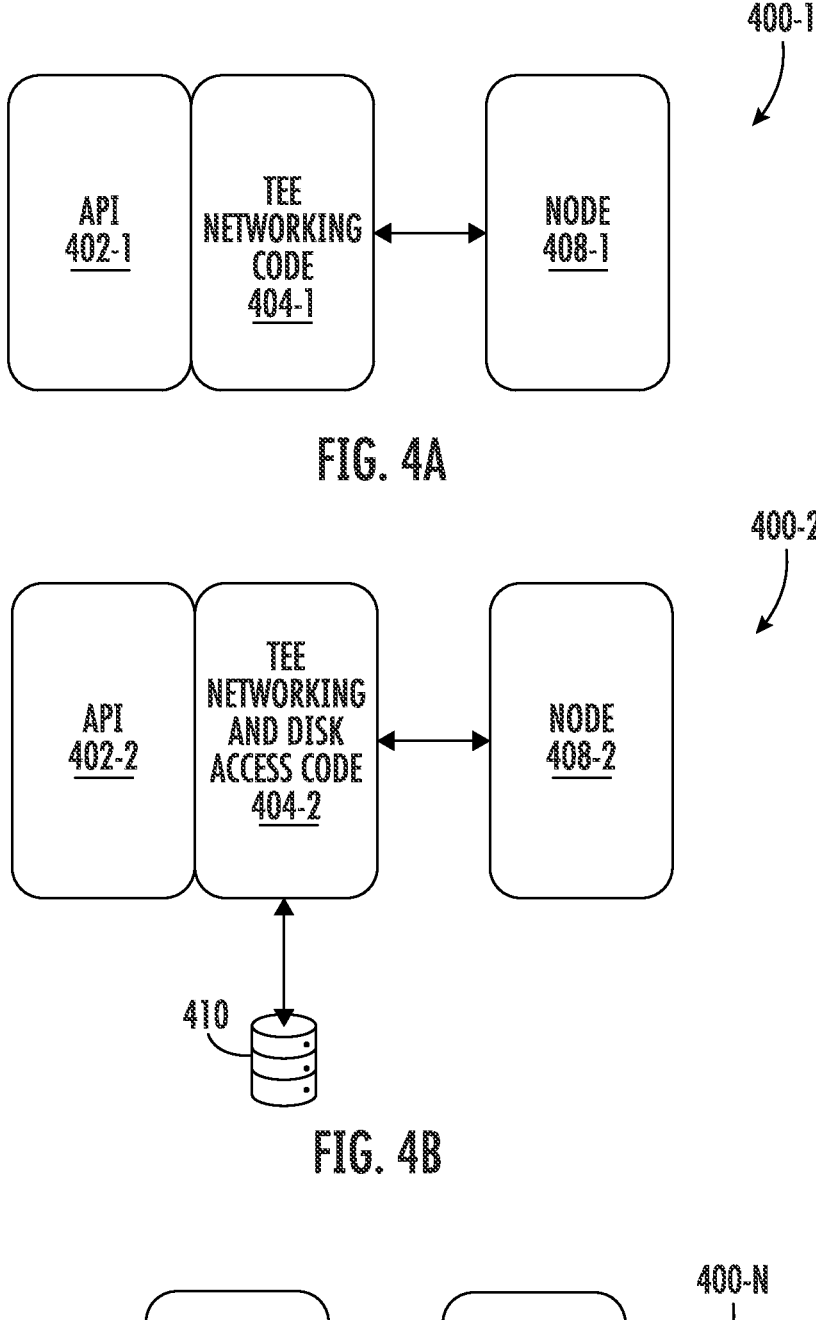
FIG. 4A
FIG. 4B
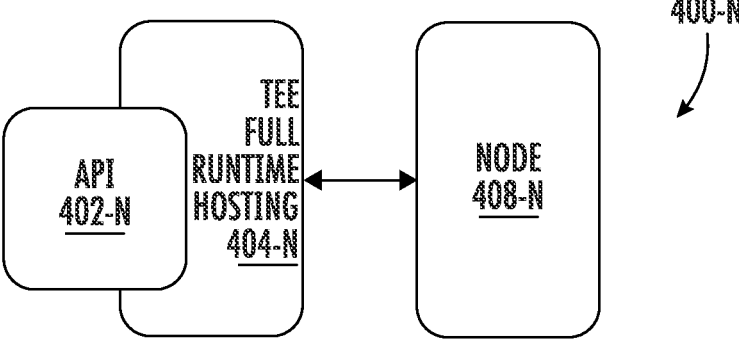
FIG. 4C

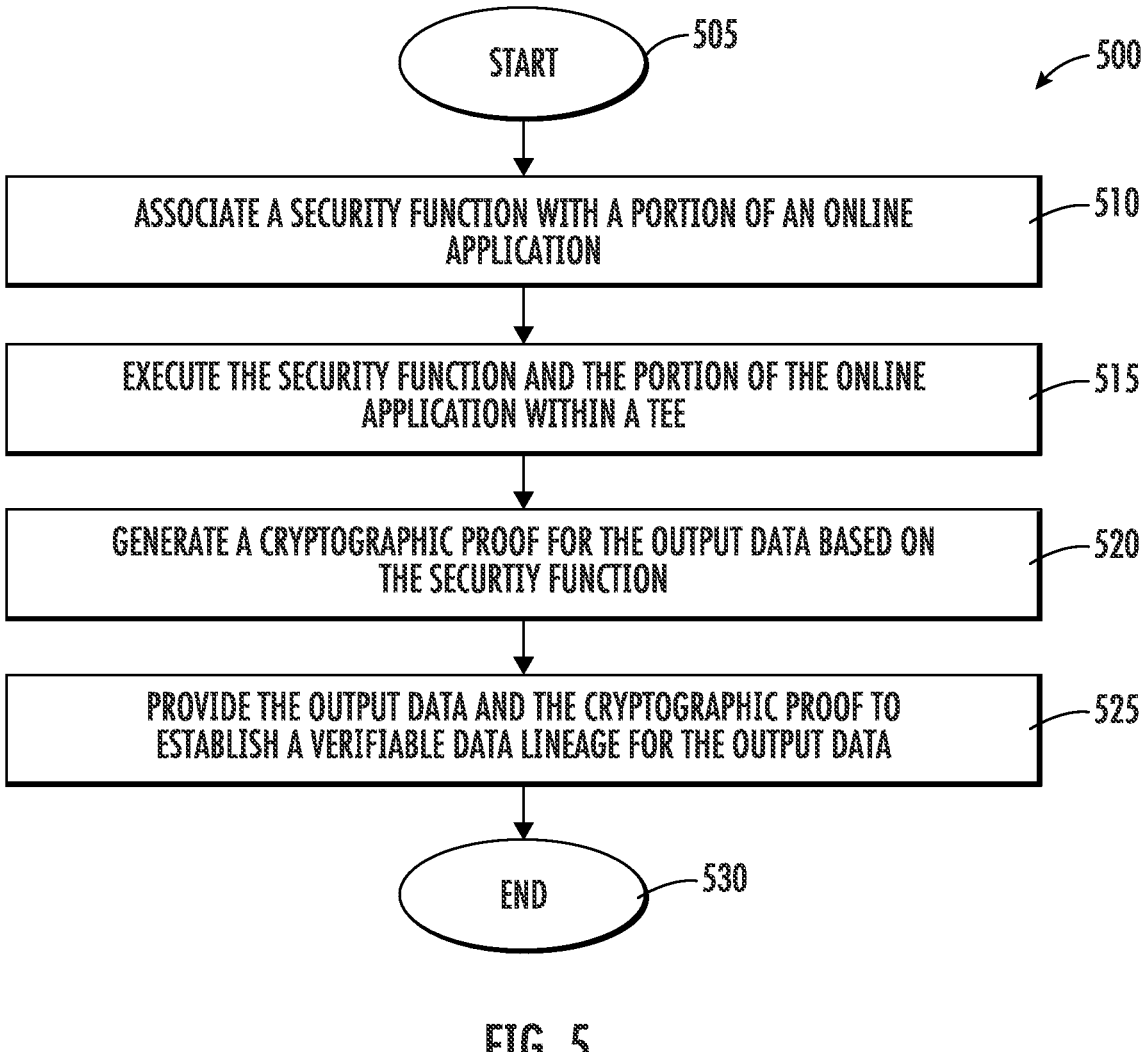

START — 505

500

ASSOCIATE A SECURITY FUNCTION WITH A PORTION OF AN ONLINE APPLICATION — 510

EXECUTE THE SECURITY FUNCTION AND THE PORTION OF THE ONLINE APPLICATION WITHIN A TEE — 515

GENERATE A CRYPTOGRAPHIC PROOF FOR THE OUTPUT DATA BASED ON THE SECURTIY FUNCTION — 520

PROVIDE THE OUTPUT DATA AND THE CRYPTOGRAPHIC PROOF TO ESTABLISH A VERIFIABLE DATA LINEAGE FOR THE OUTPUT DATA — 525

END — 530

FIG. 5

TRUSTED EXECUTION ENVIRONMENT FOR DISTRIBUTED DATA SECURITY IN THE SERVICE MESH

TECHNICAL FIELD

The present disclosure relates generally to computer networks, and, more particularly, to trusted execution environment for distributed data security in the service mesh.

BACKGROUND

Modern cloud native applications extensively leverage services via application programming interfaces (APIs). For example, a given application may use Twilio for cloud communication, Stripe for payment processing, Google Maps for geolocation for delivery, and the like. To execute a function, one service may request data from potentially dozens of other services.

The data communication between these services can represent a security risk if communication/data handling is not handled securely. By default, there is presently no intrinsic security between services in a service mesh. However, conventional service meshes implement certain security functions such as by encrypting and decrypting the inter-service communications via sidecar proxies that attach to a service and connect to the control plane of the service mesh.

Conventionally, a service mesh pulls security from an application programming interface (API) into a sidecar proxy. However, there is a cost to doing so, as every API call requires decrypting/re-encrypting. In addition, this doesn't work when accessing 3rd party APIs. The service mesh also doesn't control other things that the API does with the data, such as writing to disk. As such, attempts to secure service mesh communications with sidecar proxies represent resource intensive approaches of limited reach and efficacy.

BRIEF DESCRIPTION OF THE DRAWINGS

The implementations herein may be better understood by referring to the following description in conjunction with the accompanying drawings in which like reference numerals indicate identically or functionally similar elements, of which:

FIGS. 4A-4C illustrate examples of environments for TEE-based distributed data security in a service mesh; and FIG. 5 illustrates an example of a simplified procedure for TEE-based distributed data security in a service mesh.

DESCRIPTION OF EXAMPLE EMBODIMENTS

Overview

According to one or more implementations of the disclosure, a method is introduced herein that facilitates trusted execution environment-based distributed data security in the service mesh. The method includes associating, in a service mesh, a security function with a portion of an online application that is executed in a distributed manner across the service mesh; executing the security function and the portion of the online application within a trusted execution environment of a device to produce output data; generating a cryptographic proof for the output data based on the security function; and providing the output data and the cryptographic proof to a remote execution environment within the service mesh to establish a verifiable data lineage for the output data.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
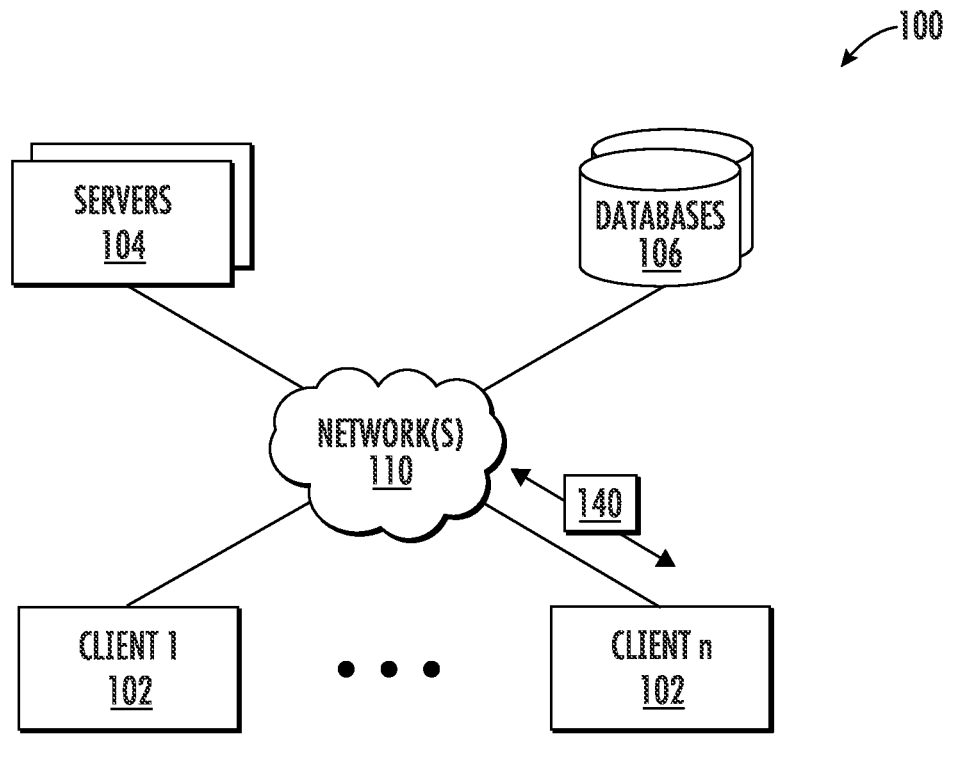
FIG. 1 illustrates an example of a schematic block diagram of an example simplified computing system.

FIG. 1 is a schematic block diagram of an example simplified computing system 100 illustratively comprising any number of client devices (e.g., client devices 102) (e.g., a first through nth client device), one or more servers 104, and one or more databases (e.g., database 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in simplified computing system 100, and that the view shown herein is for simplicity. Also, those skilled in the art will further understand that while the network is shown in a certain orientation, the simplified computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
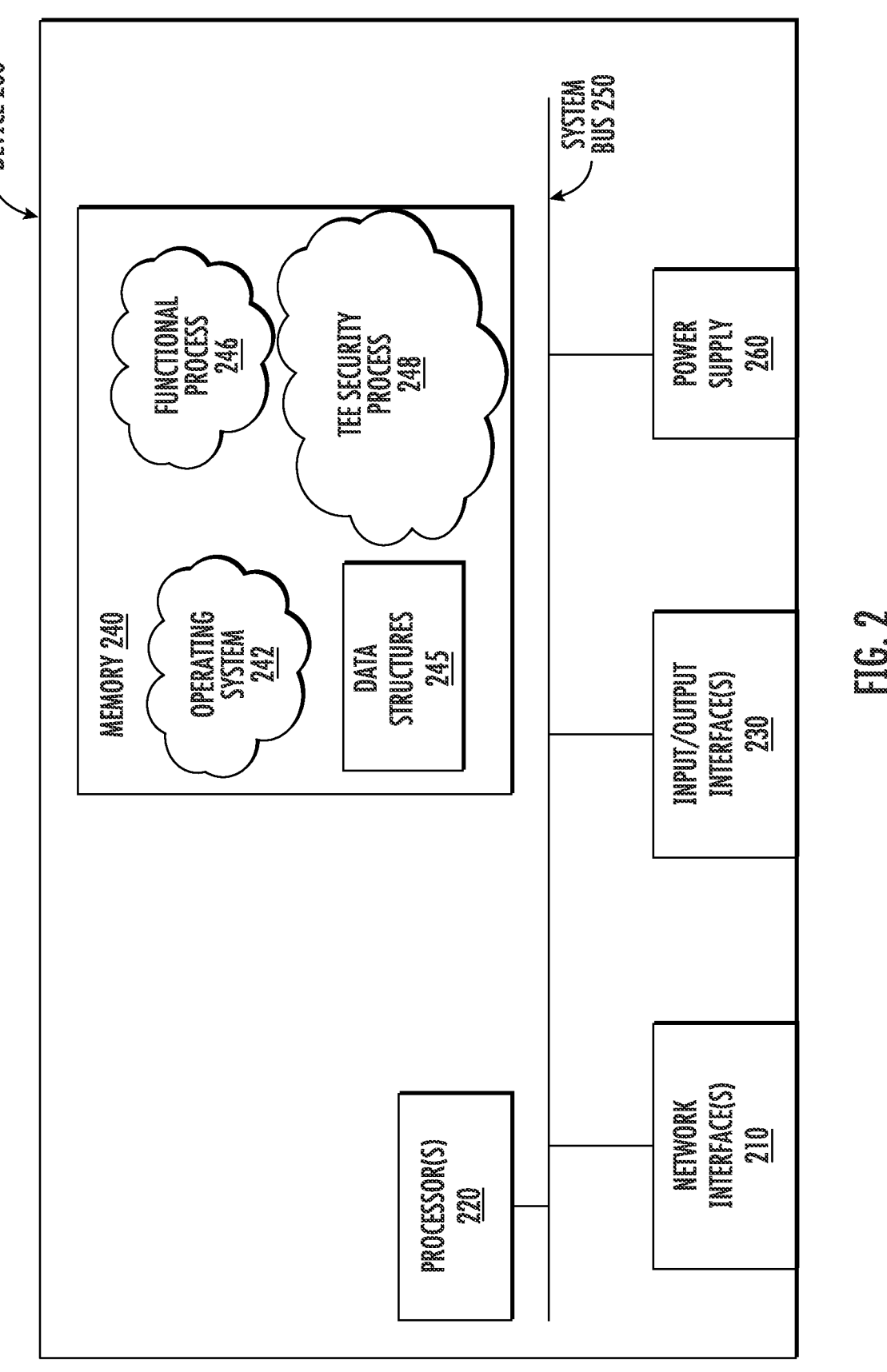
FIG. 2 illustrates an example of a network device/node.

FIG. 2 is a schematic block diagram of an example node/device 200 (e.g., an apparatus) that may be used with one or more implementations described herein, e.g., as any of the devices 102-106 shown in FIG. 1 above. Device 200 may comprise one or more network interfaces 210 (e.g., wired, wireless, etc.), at least one processor (e.g., processor 220), and a memory 240 interconnected by a system bus 250, as well as a power supply 260 (e.g., battery, plug-in, etc.).

The one or more network interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via the one or more network interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the one or more network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative process (e.g., TEE security process 248), as described herein. Notably, the one or more functional processes 246, when executed by processor 220, cause each particular device (e.g., device 200) to perform the various functions corresponding to the particular device's purpose and general configuration.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
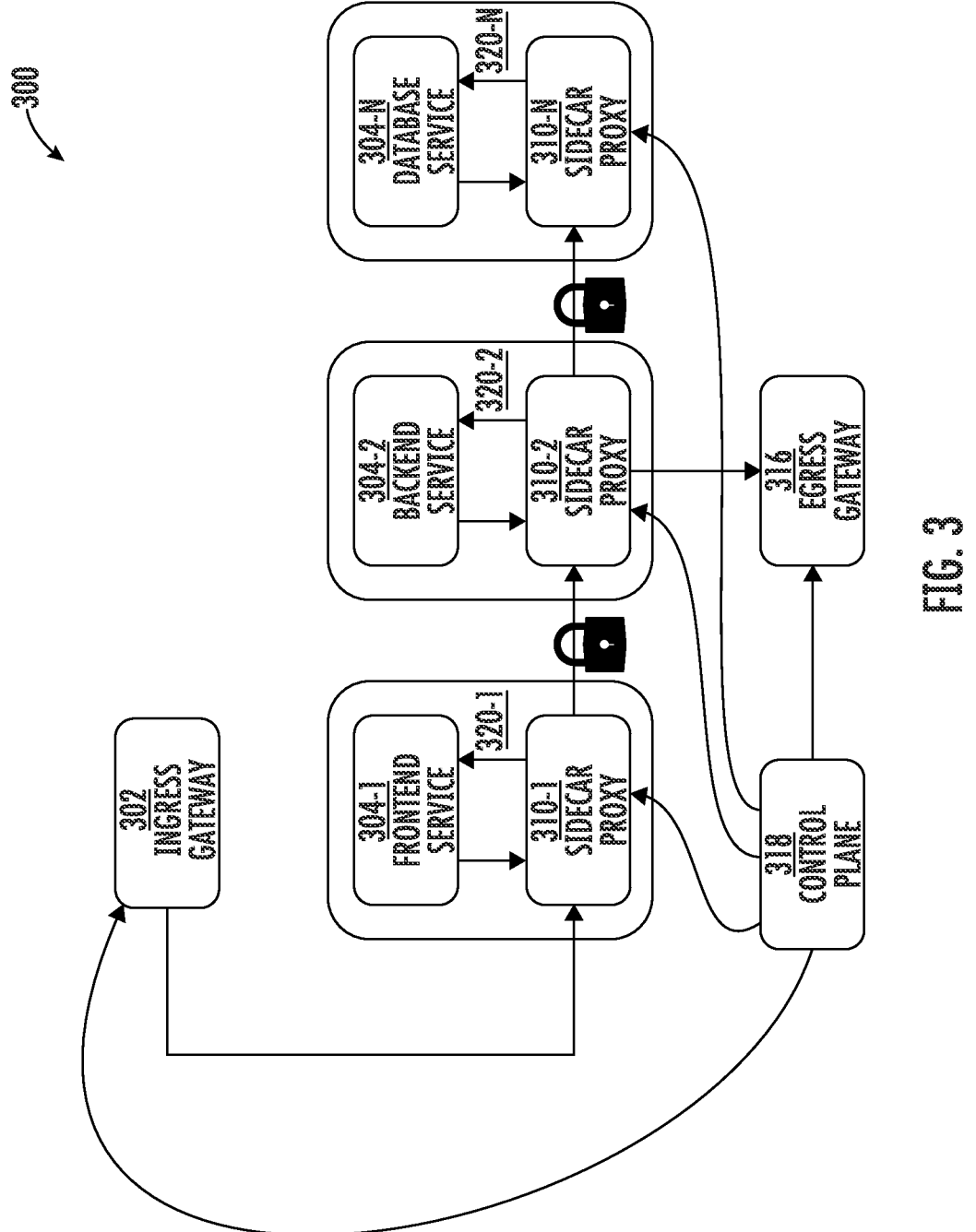
FIG. 3 illustrates an example of a service mesh architecture for communication between services or microservices.

FIG. 3 illustrates an example of a service mesh architecture 300 for facilitating communication between services or microservices. References made herein to a service(s) or microservice(s) should be understood as being interchangeable and inclusive of the one, the other, or both. Service mesh architecture 300 may be a Kubernetes service mesh which is a is a dedicated infrastructure layer for handling service-to-service communication. For example, service mesh architecture 300 may include Kubernetes pods 320 (e.g., 320-1 . . . 320-N) which may comprise one or more containers. Here, each of the microservices 304 (e.g., 304-1 . . . 304-N) or portions of an application within a respective one of the Kubernetes pods 320 of a Kubernetes service mesh. Overseeing the control plane traffic in the service mesh between such pods may be a service mesh control plane 318, such as Istio or the like.

By default, there is typically no security between microservices 304. However, as shown, sidecar proxies 310 (e.g., 310-1 . . . 310-N) may be associated with each of the microservices 304. Sidecar proxies 310 may be separate containers running along the application container used for running isolated peripheral tasks such as logging, proxying, configuration management, data security, etc. They may share the same overall lifecycle management as the parent container such that creation/termination events are in sync. The sidecar proxies 310 may be hosted and/or execute within a same one of the Kubernetes pods 320 as the microservice that it supports.

In various implementations, each microservice may be associated with a corresponding sidecar proxy that is also executed within the microservice's Kubernetes pods and which may be used to perform any number of functions with respect to microservice. For instance, sidecar proxies 310 may include lookup functions, firewall functions, security functions, or the like, as is typically done today. In service meshes having a goal of end-to-end encryption, a service mesh may inject a sidecar proxy with a TLS certificate into each pod. Control planes may also come with a certificate authority that rotates the certificates.

With a service mesh, all of the traffic may be routed through ingress (e.g., ingress gateway 302) and egress (e.g., egress gateway 316) through a sidecar proxies 310. The sidecar proxies 310 may then add tracing headers to a request. When a request comes through the ingress gateway 302 to the front end that goes to the back end, a trace may be generated for all of those requests without having to instrument code.

As noted above, conventional approaches to securing applications in services meshes have involved the implementation of security functions within sidecar proxies that attach to a (micro-) service and connect to the control plane of the service mesh. These sidecar proxies serve as intermediaries between services, handling tasks such as security enforcement like authentication, authorization, and encryption to protect communication between services. However, reliance on sidecar proxies as separate entities introduces complexity, potential performance bottlenecks, and difficulties in ensuring consistent security policies across a diverse microservices ecosystem.

For example, there is a computational and performance cost associated with pulling security from an application programming interface (API) into a sidecar proxy, as every API call requires decrypting/re-encrypting. In addition, this approach doesn't work when accessing 3rd party APIs. The service mesh also doesn't control other things that the API does with the data, such as writing to a disk. As such, distributed data security cannot be accomplished under the current sidecar proxy paradigm.

Trusted Execution Environment for Distributed Data Security in the Service Mesh

In contrast, the techniques herein introduce mechanisms that do away with the insufficient sidecar proxies as a separate application and move the functionality into trusted software running inside a trusted execution environment (TEE) as part of the application subject to those operations itself. By facilitating the incorporation of formerly sidecar proxy-bound security functions directly within the applications, distributed data security in a service mesh is at last realized via trusted execution environment executions and cryptographic proofs thereof.

Illustratively, the techniques described herein may be performed by hardware, software, and/or firmware, such as in accordance with TEE security process 248, which may include computer executable instructions executed by the processor 220 (or independent processor of one or more network interfaces 210) to perform functions relating to the techniques described herein.

Specifically, according to various implementations, the techniques may include, among other things, a method comprising associating, by a device in a service mesh, a security function with a portion of an online application that is executed in a distributed manner across the service mesh; executing, by the device, the security function and the portion of the online application within a trusted execution environment of the device to produce output data; generating, by the device, a cryptographic proof for the output data based on the security function; and providing, by the device, the output data and the cryptographic proof to a remote execution environment within the service mesh to establish a verifiable data lineage for the output data.

Operationally, and according to various implementations, FIGS. 4A-4C illustrate examples of environments 400 (e.g., first environment 400-1, second environment 400-2, third environment 400-3, etc.) for trusted execution environment-based distributed data security in a service mesh. The environments 400 include APIs 402 (402-1 . . . 402-N), trusted execution environments (TEEs 404) (e.g., 404-1 . . . 404-N), and nodes 408 (e.g., 408-1 . . . 408-N).

In environments 400, the security functionality traditionally expected to be handled by sidecar proxies are instead incorporated within an executing application itself. That is, an application may be equipped with code to execute secure functions itself. In order to preserve the integrity and ensure the security of the executions in a local and distributed manner, the portions of the application code that are to be subjected to security policies may be executed inside of TEEs 404.

A TEE may be a secure and isolated environment within a computing device's hardware and software architecture (e.g., a main processor of a computing device). A TEE may provide a protected space where code and data can run with a high level of security and confidentiality. A TEE may be isolated from the normal operating system and applications running on the device. This isolation prevents unauthorized access to the TEE's contents. TEEs often use secure boot processes to ensure that only trusted code and data are loaded into the environment. This prevents tampering with the TEE. Data stored within a TEE is typically encrypted, making it inaccessible to other parts of the system, even if physical access to the device is obtained.

Code executed within a TEE is considered trustworthy, as it runs in a controlled and protected environment which may be useful for security-sensitive tasks. TEEs can provide evidence of their integrity and the code they execute through processes like remote attestation. This allows external entities to verify the TEE's security status. TEEs often leverage hardware security features, such as Trusted Platform Modules (TPMs) or hardware security modules (HSMs), to enhance security. TEEs can host applications or services in a secure and isolated manner, protecting them from attacks originating outside the TEE.

By hosting portions of the application code to be subjected to certain security polices within the TEEs 404, proxying may be avoided and cryptographic proof (e.g., through attestations) may be provided with output data from execution of those portions of the application. This cryptographic proof may be used to establish that the prescribed security policies were applied in those executions and/or a data lineage/provenance associated with the output data. This technique can even be applied for communications and executions involving API servers that are not necessarily controlled by an application provider (e.g., $3^{rd}$ party APIs).

For instance, in FIG. 4A a first API 402-1 of an online application is shown in a first environment 400-1. Here, a portion of an online application (e.g., an execution of an API call for the application/first API 402-1) whose execution is to be subjected to a particular security policy is hosted and/or executed within first TEE 404-1. This portion of the online application may include network code such as may be executed for causing secure data communications across a network according to a particular security policy.

To provide an example in practical terms, the application may involve an online shopping platform that relies on various API calls to perform functions associated with purchasing a product such as determining an inventory level of a product being ordered, determining logistic details of the order, processing credit card payments, etc. Communication of customer data such as credit card information to payment processing functionality may need to be associated with various security policies to protect this data during the transaction.

This portion of the application (e.g., the code associated with communications and operations for payment processing and payment processor API calls) may, therefore, be hosted within the first TEE 404-1. In addition, a security function may be associated with the execution of the portion of the online application. The security function and the portion of the online application may be executed within the first TEE 404-1 to produce output data. A cryptographic proof for the output data may be generated based on the security function.

This cryptographic proof may include an attestation or other verification that the prescribed security policies were applied to the execution and/or that the portion of the online application was executed within the first TEE 404-1. In various implementations, the cryptographic proof (alone, chained with other cryptographic proofs by other execution environments, etc.) may establish a verifiable data lineage/provenance.

The output data and/or the cryptographic proof may be provided to first node 408-1. The first node 408-1 may include a remote execution environment (e.g., remote to the execution environment of the first API 402-1, the first TEE 404-1, etc.) within the service mesh. In some instances, the remote execution environment may be a trusted execution environment, while in others it may not be a trusted execution environment. The cryptographic proof may be used by first node 408-1 to verify that the output data that it receives is the result of an execution with intended security policies being applied by the first TEE 404-1 and/or to verify the provenance/data lineage of the received output data.

FIG. 4B illustrates an extension of this technique to include not only network functionality but also disk access functionality in a second environment 400-2. For example, the second API 402-2 may need to securely access (create, read, write, erase, update, delete, etc.) data in a database 410 and communicate that data or an associated output to an external execution environment (e.g., second node 408-2). Therefore, the portions of application code whose execution is associated with the reading of that data from database 410 and/or its communication may be hosted and/or executed in second TEE 404-2. There it is subjected to prescribed security policies and/or a security function is co-executed therewith to provide cryptographic proof of the conditions/policy of its execution and/or its data lineage.

FIG. 4C illustrates a further extension of this technique to include runtime environment hosting/execution in a third environment 400-N. The third environment 400-N may include the third API 402-N, third TEE 404-N, and third node 408-N. Here, a full runtime environment for a portion of the application is hosted and/or executed within the third TEE 404-N. For example, for API servers that have a runtime environment like WebAssembly (WASM), the run time environment may be placed into the third TEE 404-N, and cryptographic proof that associated data was processed in a secure environment may be produced.

In various implementations an entire application may not be able to be hosted, stored, executed, etc. within a TEE due to performance and/or size limitations. As such the portion or portions hosted, stored, and/or executed within the TEE may be less than the entire application and/or only be those portions that require additional security policies.

Further, secure components can be trusted or untrusted versions. Secure components (such as code modules, libraries, or software components) may already exist and have been verified as secure and trustworthy. These trusted versions of components can be directly integrated into the TEE. These components are known to be reliable and can be securely executed within the TEE. Alternatively, or additionally, secure components may not be trusted versions. These components may be dynamically uploaded to a TEE. For instance, may be necessary to incorporate new or updated components into the TEE dynamically as these components might not initially be considered trusted because they haven't undergone a prior verification process. However, they can still be introduced into the TEE. Their introduction may involve verification/attestation processes.

As previously described, the cryptographic proofs provided by TEEs 404 may be utilized to establish a verifiable data lineage for output data resulting from TEE executions. For example, attestations from the TEE's may be chained together and establish cryptographically verifiable data provenance/data lineage of output data. This may mean that a cryptographic proof may be chained to other cryptographic proofs from the same execution environment (e.g., generated by the same TEE, etc.) or other execution environments (e.g., generated by other TEEs, etc.).

FIG. 5 illustrates an example simplified procedure for TEE-based distributed data security in the service mesh in accordance with one or more implementations described herein. For example, a non-generic, specifically configured device (e.g., device 200) may perform procedure 500 by executing stored instructions (e.g., TEE security process 248).

Procedure 500 may start at step 505, and continues to step 510, where, as described in greater detail above, a security function may be associated with a portion of an online application that is executed in a distributed manner across a service mesh. The security function may be associated with a variety of application operations and/or API calls. For example, the security function may be associated with secure communications of a packet across a network. In some implementations, the security function may be associated with secure filed system access operations.

The portion of the online application may be a trusted version that is pre-installed within the trusted execution environment. Alternatively, or additionally, the portion of the online application may be dynamically uploaded to the trusted execution environment on an as-needed basis.

At step 515, as detailed above, the security function and the portion of the online application may be executed within a trusted execution environment of the device to produce output data. Executing the portion of the online application may include hosting a runtime environment for an application programming interface (API) server associated with the portion of the online application.

At step 520, a cryptographic proof may be generated for the output data based on the security function. The cryptographic proof may include an attestation that a security policy defined for the portion of the online application is applied to its execution within the trusted execution environment. The trusted execution environment may utilize hardware-based encryption to protect data integrity during execution of the portion of the online application.

At step 525, as detailed above, the output data and the cryptographic proof may be provided to a remote execution environment within the service mesh to establish a verifiable data lineage for the output data. The remote execution environment may be a trusted execution environment. The remote execution environment may not be a trusted execution environment in other implementations. Providing the cryptographic proof to the remote execution environment may include providing the cryptographic proof in a chain with prior cryptographic proofs.

Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, facilitate integration of security functionality from sidecar proxies into applications hosted within TEEs. This achieves heightened security, ensuring that code and data are protected from unauthorized access or tampering and removing an attack surface that may be presented by a sidecar proxy and/or its operations. The use of TEEs enables cryptographic proof through attestations, allowing applications to verifiably demonstrate the application of security policies, even when interacting with third-party APIs. This also extends security to various application operations, such as disk access, enhancing overall data protection. Additionally, it provides the flexibility to include secure components, either as trusted versions or dynamically uploaded modules, with the ability to chain attestations for cryptographically verifiable data lineage. These advancements contribute to distributed data security in the service mesh providing a robust and adaptable security framework, essential for safeguarding sensitive data and ensuring trustworthiness in diverse computing environments.

According to the implementations herein, an illustrative method herein may comprise associating, by a device in a service mesh, a security function with a portion of an online application that is executed in a distributed manner across the service mesh; executing, by the device, the security function and the portion of the online application within a trusted execution environment of the device to produce output data; generating, by the device, a cryptographic proof for the output data based on the security function; and providing, by the device, the output data and the cryptographic proof to a remote execution environment within the service mesh to establish a verifiable data lineage for the output data.

In one implementation, executing the portion of the online application includes hosting a runtime environment for an application programming interface (API) server associated with the portion of the online application. In one implementation, the security function is associated with secure communications of a packet across a network. In one implementation, the security function is associated with secure file system access operations. In one implementation, the cryptographic proof includes an attestation that a security policy defined for the portion of the online application is applied to its execution within the trusted execution environment.

In one implementation, the remote execution environment is a trusted execution environment. In one implementation, the remote execution environment is not a trusted execution environment. In one implementation, the portion of the online application is a trusted version that is pre-installed within the trusted execution environment. In one implementation, the portion of the online application is dynamically uploaded to the trusted execution environment on an as-needed basis. In one implementation, the trusted execution environment utilizes hardware-based encryption to protect data integrity during execution of the portion of the online application. In one implementation, providing the cryptographic proof to the remote execution environment includes providing the cryptographic proof in a chain with prior cryptographic proofs.

According to the implementations herein, an illustrative tangible, non-transitory, computer-readable medium having computer-executable instructions stored thereon that, when executed by a processor on a computer, cause the computer to perform a method comprising: associating, in a service mesh, a security function with a portion of an online application that is executed in a distributed manner across the service mesh; executing the security function and the portion of the online application within a trusted execution environment of a device to produce output data; generating a cryptographic proof for the output data based on the security function; and providing the output data and the cryptographic proof to a remote execution environment within the service mesh to establish a verifiable data lineage for the output data.

According to the implementations herein, an illustrative apparatus comprising: one or more network interfaces to communicate with a network; a processor coupled to the one or more network interfaces and configured to execute one or more processes; and a memory configured to store a process that is executable by the processor, the process, when executed, configured to: associate, in a service mesh, a security function with a portion of an online application that is executed in a distributed manner across the service mesh; execute the security function and the portion of the online application within a trusted execution environment of a device to produce output data; generate a cryptographic proof for the output data based on the security function; and provide the output data and the cryptographic proof to a remote execution environment within the service mesh to establish a verifiable data lineage for the output data.

While there have been shown and described illustrative implementations that provide for trusted execution environment for distributed data security in the service mesh, it is to be understood that various other adaptations and modifications may be made within the spirit and scope of the implementations herein. For example, while certain implementations are described herein with respect to hosting particular functions and/or runtime environments within a TEE, the hostable functions are not limited as such and may include functions and/or runtime environments, in other implementations. In addition, certain implementations describe the execution of portions of the application as occurring in a device, a TEE, in association with a security function, involving a cryptographic proof. However, it should be noted that implementations may involve more than one of each of these and/or that each of the components and the actions they perform may be distributed across multiple such components.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method, comprising:

associating, by a device in a service mesh, a security function with a portion of an online application that is executed in a distributed manner across the service mesh;

executing, by the device, the security function and the portion of the online application within a trusted execution environment of the device to produce output data;

generating, by the device and based on the security function, a cryptographic proof for the output data comprising a remote attestation that a security policy defined for the portion of the online application was applied during an execution that produced the output data within the trusted execution environment; and providing, by the device, the output data and the cryptographic proof to a remote execution environment within the service mesh to establish a verifiable data lineage for the output data.

2. The method of claim 1, wherein executing the portion of the online application includes hosting a runtime environment for an application programming interface (API) server associated with the portion of the online application.

3. The method of claim 1, wherein the security function is associated with secure communications of a packet across a network.

4. The method of claim 1, wherein the security function is associated with secure file system access operations.

5. The method of claim 1, wherein the remote execution environment comprises a microservice node in the service mesh.

6. The method of claim 1, wherein the remote execution environment is a trusted execution environment.

7. The method of claim 1, wherein the remote execution environment is not a trusted execution environment.

8. The method of claim 1, wherein the portion of the online application is a trusted version that is pre-installed within the trusted execution environment.

9. The method of claim 1, wherein the portion of the online application is dynamically uploaded to the trusted execution environment on an as-needed basis.

10. The method of claim 1, wherein the trusted execution environment utilizes a hardware-based encryption to protect data integrity during execution of the portion of the online application.

11. The method of claim 1, wherein providing the cryptographic proof to the remote execution environment includes providing the cryptographic proof in a chain with prior cryptographic proofs.

12. A tangible, non-transitory, computer-readable medium having computer-executable instructions stored thereon that, when executed by a processor on a computer, cause the computer to perform a method comprising:

associating, in a service mesh, a security function with a portion of an online application that is executed in a distributed manner across the service mesh;

executing the security function and the portion of the online application within a trusted execution environment of a device to produce output data;

generating, based on the security function, a cryptographic proof for the output data comprising a remote attestation that a security policy defined for the portion of the online application was applied during an execution that produced the output data within the trusted execution environment; and providing the output data and the cryptographic proof to a remote execution environment within the service mesh to establish a verifiable data lineage for the output data.

13. The tangible, non-transitory, computer-readable medium as in claim 12, wherein executing the portion of the online application includes hosting a runtime environment for an application programming interface (API) server associated with the portion of the online application.

14. The tangible, non-transitory, computer-readable medium as in claim 12, wherein the security function is associated with secure communications of a packet across a network.

15. The tangible, non-transitory, computer-readable medium as in claim 12, wherein the remote execution environment comprises a microservice node in the service mesh.

16. The tangible, non-transitory, computer-readable medium as in claim 12, wherein the cryptographic proof includes an attestation that a security policy defined for the portion of the online application is applied to its execution within the trusted execution environment.

17. The tangible, non-transitory, computer-readable medium as in claim 12, wherein the remote execution environment in a trusted execution environment.

18. The tangible, non-transitory, computer-readable medium as in claim 12, wherein the remote execution environment is not a trusted execution environment.

19. The tangible, non-transitory, computer-readable medium as in claim 12, wherein providing the cryptographic proof to the remote execution environment includes providing the cryptographic proof in a chain with prior cryptographic proofs.

20. An apparatus, comprising:

one or more network interfaces to communicate with a network;

a processor coupled to the one or more network interfaces and configured to execute one or more processes; and a memory configured to store a process that is executable by the processor, the process, when executed, configured to:

associate, in a service mesh, a security function with a portion of an online application that is executed in a distributed manner across the service mesh;

execute the security function and the portion of the online application within a trusted execution environment of a device to produce output data;

generate, based on the security function, a cryptographic proof for the output data comprising a remote attestation that a security policy defined for the portion of the online application was applied during an execution that produced the output data within the trusted execution environment; and provide the output data and the cryptographic proof to a remote execution environment within the service mesh to establish a verifiable data lineage for the output data.

* * * * *